(12) United States Patent
Helder et al.

(10) Patent No.: US 7,189,064 B2
(45) Date of Patent: Mar. 13, 2007

(54) FRICTION STIR WELDED HOLLOW AIRFOILS AND METHOD THEREFOR

(75) Inventors: Earl Claude Helder, Cincinnati, OH (US); Timothy Joseph Trapp, Upper Arlington, OH (US); John Robert Kelley, Cincinnati, OH (US); Vicky S. Budinger, Loveland, OH (US); Courtney James Tudor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 223 days.

(21) Appl. No.: 10/846,326

(22) Filed: May 14, 2004

(65) Prior Publication Data

US 2005/0254955 A1    Nov. 17, 2005

(51) Int. Cl.
*F01D 5/18* (2006.01)
(52) U.S. Cl. .................... 416/232; 416/233; 416/299 R
(58) Field of Classification Search ................ 416/226, 416/232, 233
See application file for complete search history.

(56) References Cited

U.S. PATENT DOCUMENTS

| | | | |
|---|---|---|---|
| 1,992,338 A * | 2/1935 | Whitworth | 416/233 |
| 3,359,936 A * | 12/1967 | Kock | 114/274 |
| 4,820,117 A * | 4/1989 | Larrabee et al. | 415/142 |
| 5,099,573 A | 3/1992 | Krauss | |
| 5,469,618 A | 11/1995 | LeMonds | |
| 5,655,883 A | 8/1997 | Schilling | |
| 5,725,355 A * | 3/1998 | Crall et al. | 416/229 A |
| 5,797,182 A * | 8/1998 | Furlan et al. | 29/889.21 |
| 6,450,394 B1 | 9/2002 | Wollawston | |
| 6,484,924 B1 * | 11/2002 | Forrest | 228/112.1 |
| 6,543,670 B2 | 4/2003 | Mahoney | |
| 6,568,582 B2 | 5/2003 | Colligan | |
| 6,676,004 B1 | 1/2004 | Trapp | |
| 2001/0007634 A1 | 7/2001 | Beyer | |

FOREIGN PATENT DOCUMENTS

| | | |
|---|---|---|
| EP | 0 867 621 A1 | 9/1998 |
| EP | 1 291 115 A2 | 3/2003 |
| EP | 1 462 609 A | 9/2004 |
| JP | 2004 017097 | 1/2004 |

OTHER PUBLICATIONS

Michael A. Dornheim, JSF Vertical Flights Leading to Downselect, Jul. 2, 2001, Aviation Week & Space Technology vol. 155, No. 1, p. 30.*
Greitmann et al., Application of Special Welding Processes, Jul. 2002, Deutscher Verlag fur Schweisstechnik GmbH, vol. 54, N. 7, pp. 228-230.*

* cited by examiner

*Primary Examiner*—Edward K. Look
*Assistant Examiner*—Devin Hanan
(74) *Attorney, Agent, or Firm*—Adams Evans, P.A.; Theodore P. Cummings

(57) ABSTRACT

A hollow component for gas turbine engine, for example an outlet guide vane, is assembled from a body having at recessed pocket formed therein, and an aerodynamic cover bonded over the pocket. Both the cover and the body are constructed from materials which are not readily fusion weldable. The cover is attached to the body by a solid state bonding process, for example friction stir welding. The hollow component may also be built up from multiple individual components which are bonded to each other by a solid state bonding process such as friction stir welding.

33 Claims, 9 Drawing Sheets

FRICTION STIR WELDED HOLLOW AIRFOILS AND METHOD THEREFOR

BACKGROUND OF THE INVENTION

This invention relates generally to hollow components for gas turbine engines and more particularly to hollow airfoils constructed by friction stir welding.

Aluminum forgings in various alloy compositions are commonly used for gas turbine engine components, for example non-rotating airfoils in the fan and compressor. Such airfoils often have a hollow cross-section to minimize their weight. The alloys of choice, e.g. most 2000- and 7000-series aluminum alloys, may be difficult or impossible to join by conventional fusion welding techniques.

Therefore, prior art methods for producing hollow airfoils involve gun drilling to remove core material, or pocket milling followed by adhesive bonding of a cover sheet over the milled pocket. The pocket may or may not be filled with honeycomb material, and may or may not incorporate stiffener ribs for improved load carrying capabilities and/or fatigue resistance.

Gun drilling is a tedious and inefficient method for removing the maximum core material to optimize weight reduction. On the other hand, pocket milling followed by adhesive bonding of a cover has the disadvantage of excessive adhesive bond quality variability, tedious preparation and processing for adhesive bonding success, excessive lap joint widths to obtain adequate adhesive bond strength, and inability to reliably seal the internal pocket from the external environment resulting in excessive susceptibility to undetected internal corrosion and/or stress corrosion cracking over time.

Accordingly, there is a need for an efficient method for producing sealed hollow components with reliable bond quality.

BRIEF SUMMARY OF THE INVENTION

The above-mentioned need is met by the present invention, which according to one aspect provides a hollow airfoil including a metallic body having opposed pressure and suction sides, a root, a tip, and spaced-apart leading and trailing edges. The body has a recessed pocket formed in a selected one of the pressure and suction sides. A metallic cover having an outer peripheral edge, an inner surface, and an outer surface which defines at least a portion of the selected side is attached to the body by a solid state bond.

According to another aspect of the invention, a method of making a hollow airfoil includes providing an airfoil-shaped body having spaced-apart leading and trailing edges, spaced-apart pressure and suction sides, a root, and a tip. A selected one of the pressure and suction sides has a pocket formed therein. A cover has with a perimeter matching the perimeter of the pocket, and an outer surface defining at least a portion of the selected one of the pressure or suction sides. The cover is placed in the pocket and joined to the body by friction stir welding.

According to another aspect of the invention, a method of making a hollow component for gas turbine engine includes providing a body having spaced-apart first and second sides, the first side having recessed pocket formed therein, and providing a cover having inner and outer surfaces, the outer surface of the cover conforming to the shape of the first side of the body. The cover is placed in the pocket and is attached to the body by friction stir welding.

According to another aspect of the invention, a hollow airfoil has opposed pressure and suction sides, a root, a tip, and spaced-apart leading and trailing edges, the airfoil includes a metallic pressure side wall extending from the leading edge to the trailing edge; a metallic suction side wall extending from the leading edge to the trailing edge, the suction side wall being disposed in spaced-apart relation to the pressure side wall; a metallic leading edge spacer extending from the root to said tip, and disposed between the pressure and suction side walls; and a metallic trailing edge spacer extending from the root to the tip and disposed between the pressure and suction side walls. The pressure side wall and the suction side wall are attached to the leading and trailing edge spacers by a plurality of solid state bonds.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
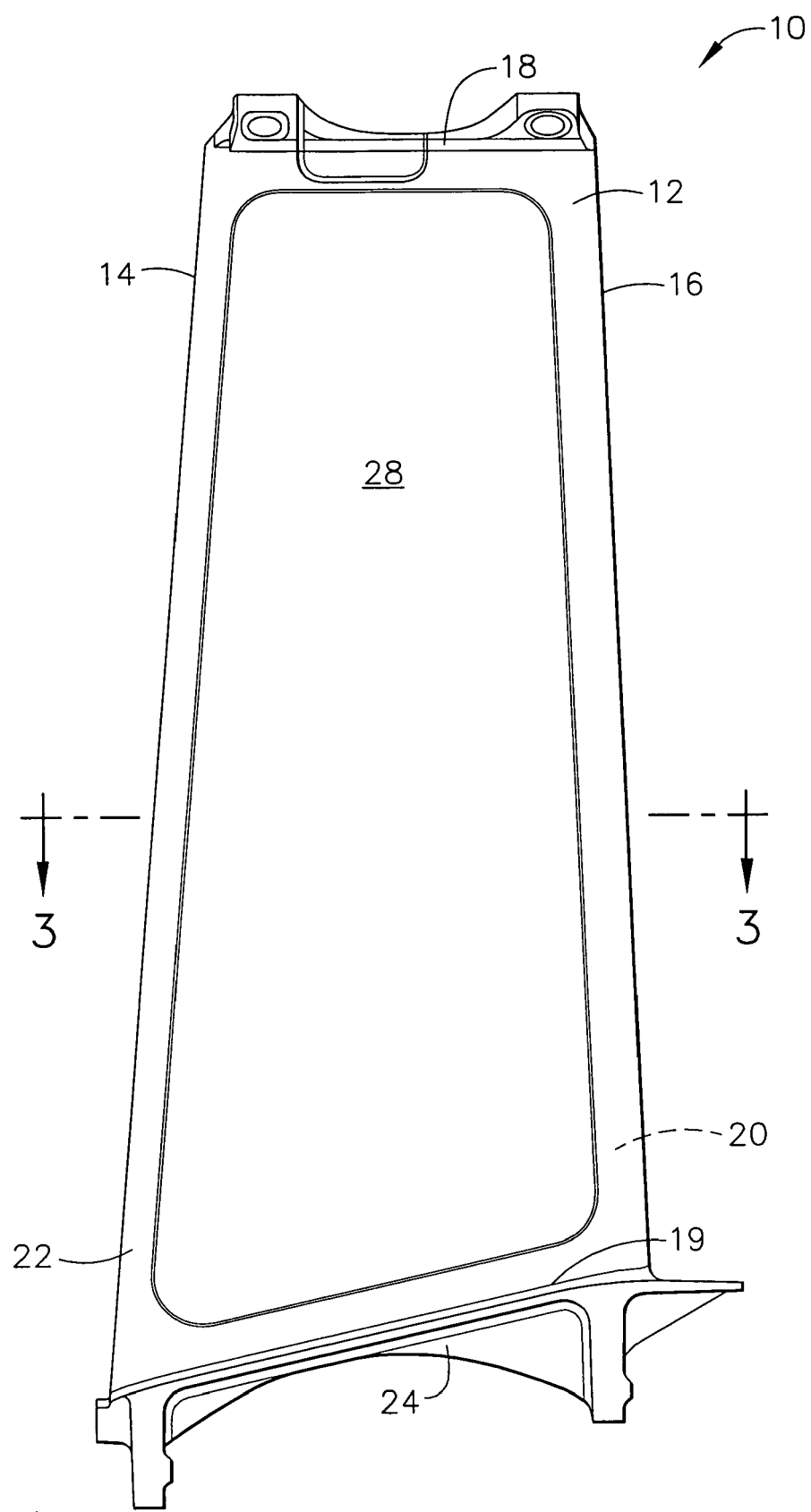
FIG. 1 is a side view of an outlet guide vane constructed in accordance with the present invention.
Figure 2:
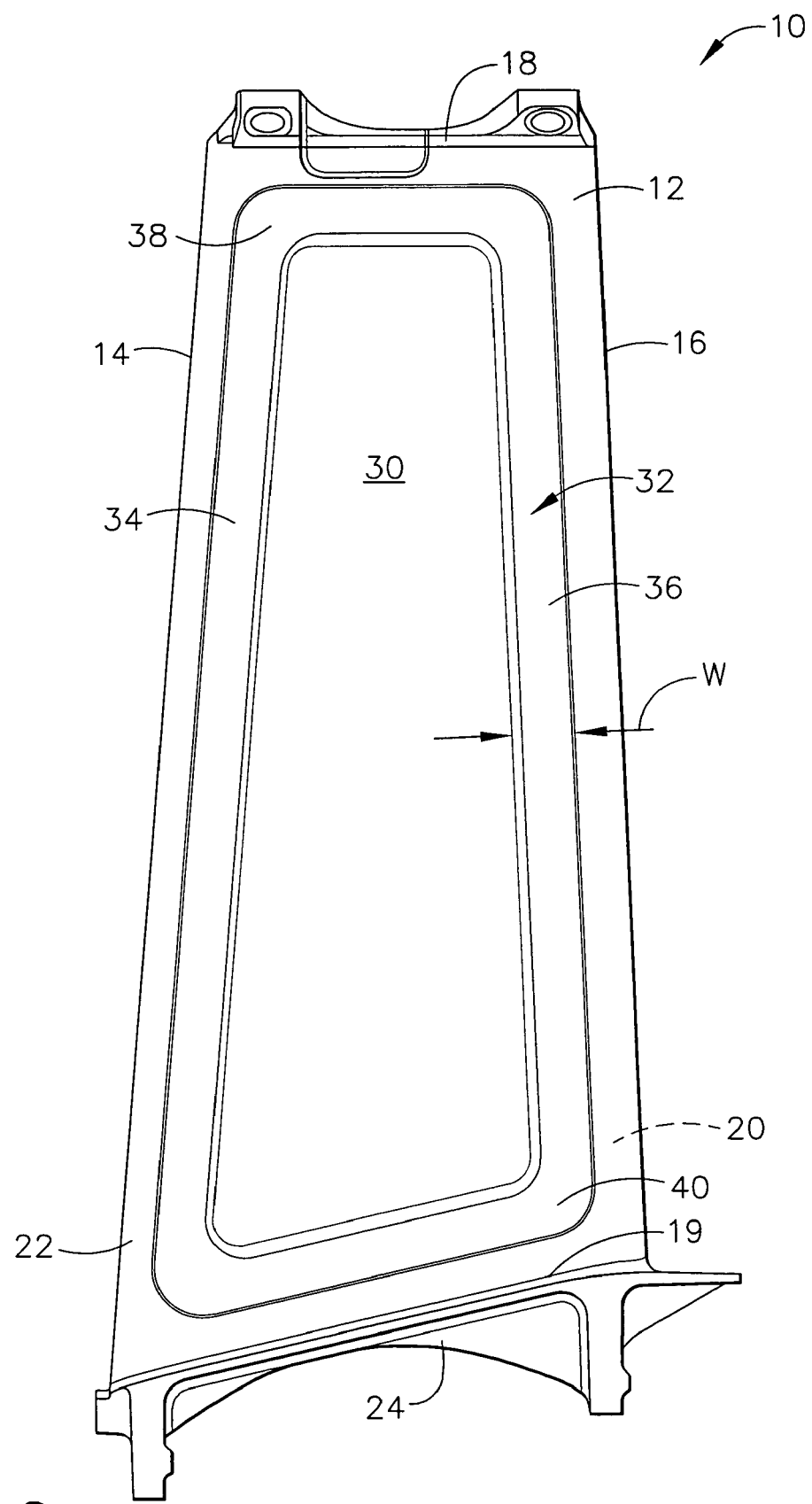
FIG. 2 is a side view of the outlet guide vane of FIG. 1 with a cover removed therefrom.
Figure 3:
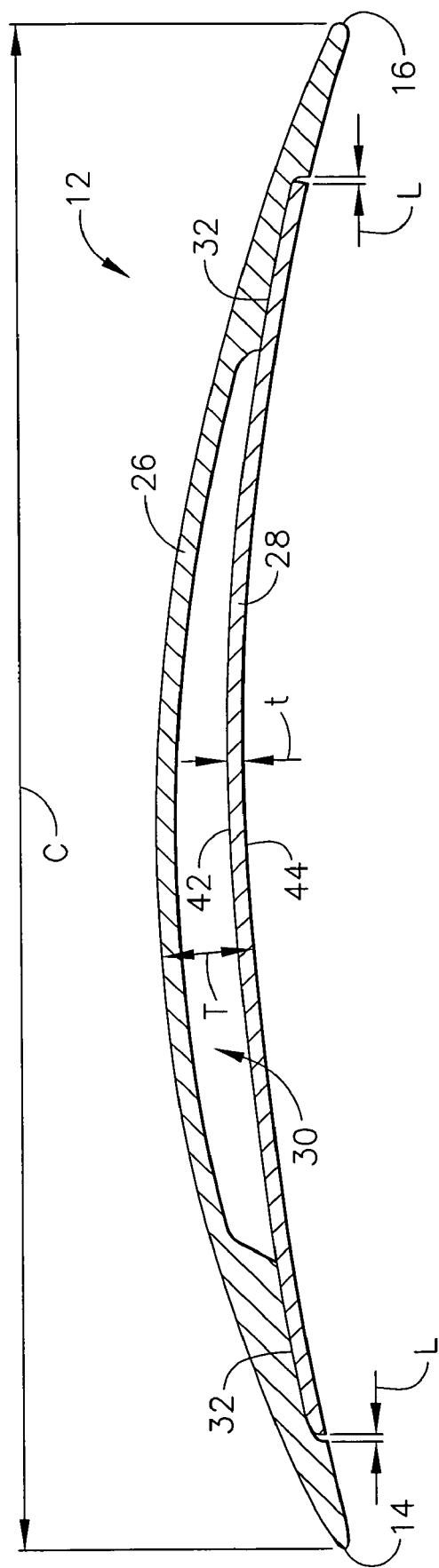
FIG. 3 is a cross-sectional view taken along lines 3—3 of FIG. 1.

Referring to the drawings wherein identical reference numerals denote the same elements throughout the various views, FIGS. 1–3 depict an exemplary fan outlet guide vane 10 for a gas turbine engine. The present invention is equally applicable to the construction of other types of hollow components, such as rotating turbine blades, frame struts, and the like. The outlet guide vane 10 comprises an airfoil 12 having a leading edge 14, a trailing edge 16, a tip 18, a root 19, a convex suction side 20, and a concave pressure side 22. An arcuate inner platform 24 is attached to the root 19 of the airfoil 12.

The illustrated airfoil 12 has an overall thickness T of about 2.54 cm (1 in.) and a chord length C of about 24 cm (9.5 in.) The airfoil 12 is assembled from a body 26 and a cover 28. The body 26 and the cover 28 are both made from a material with suitable strength and weight characteristics for the intended application. One suitable alloy is a 7000 series aluminum alloy, in particular a 7075 aluminum alloy. The body 26 is a unitary component which may be produced by forging. It includes a recessed pocket 30 (see FIG. 2) formed in its pressure side 22 to reduce the weight of the airfoil 12. It could also be formed in the suction side 20. There is a continuous ledge 32 disposed around the periphery of the pocket 30 that the periphery of the cover 28 is welded to. The ledge 32 has a leading edge portion 34, a trailing edge portion 36, a tip portion 38, and a root portion 40. This ledge 32 has an average width "W" which is selected to be as narrow as possible to save weight and material, while still leaving enough material for a full penetration weld through the cover 28. In the illustrated example, the width W is less than about 1.27 cm (0.5 in.) and is preferably about 0.89 cm (0.35 in.) Depending on the particular application, a filler material of a known type (not shown) may be placed in the pocket 30 and bonded to the body 26 and/or the cover 28, for example with an adhesive. Any filler material which will help restrain the relatively flexible cover 28 against vibration and/or stiffen the airfoil 12 may be used. Examples of suitable filler materials include metallic honeycomb structures, epoxy with microballoons disposed therein, polyurethane foam, and nanostructures.

The cover 28 is a unitary component including inner and outer surfaces 42 and 44 which fits down into the pocket 30 so that the outer surface 44 is substantially flush with the pressure side 22 of the airfoil 12. The outer surface 44 of the cover 28 forms a portion of the pressure side 22 of the airfoil 12. In plan view, the cover 28 it is generally rectangular with radiused corners. It serves only as an aerodynamic element and may have a relatively small thickness t, for example approximately 2 mm (0.08 in.). To provide an acceptable weld joint, the periphery of the cover 28 is fitted to the periphery of the pocket 30 with a small lateral tolerance "L", for example about 0.127 mm (0.005 in.)

Figure 4:
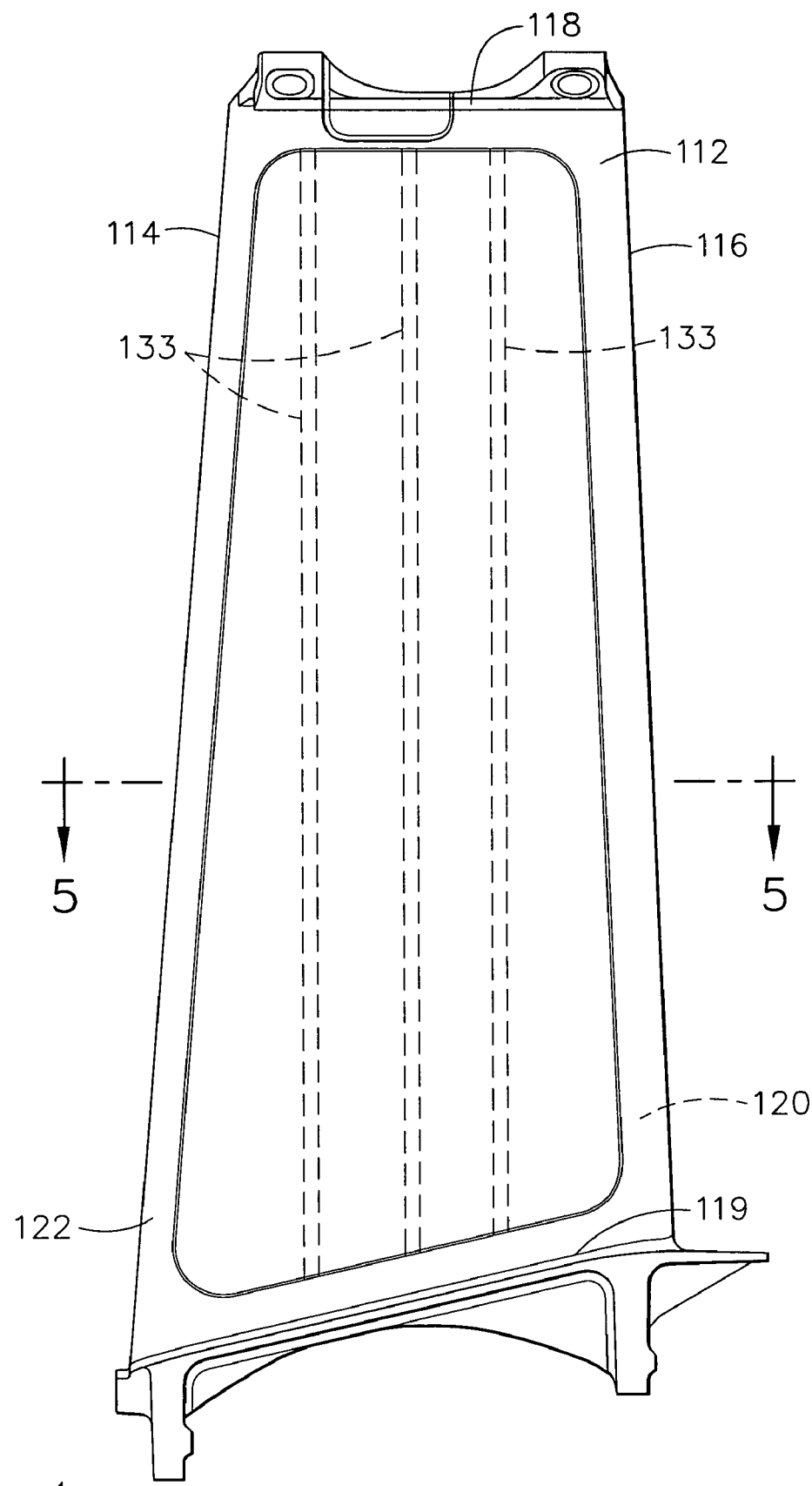
FIG. 4 is a side view of an outlet guide vane constructed according to an alternate embodiment of the invention.
Figure 5:
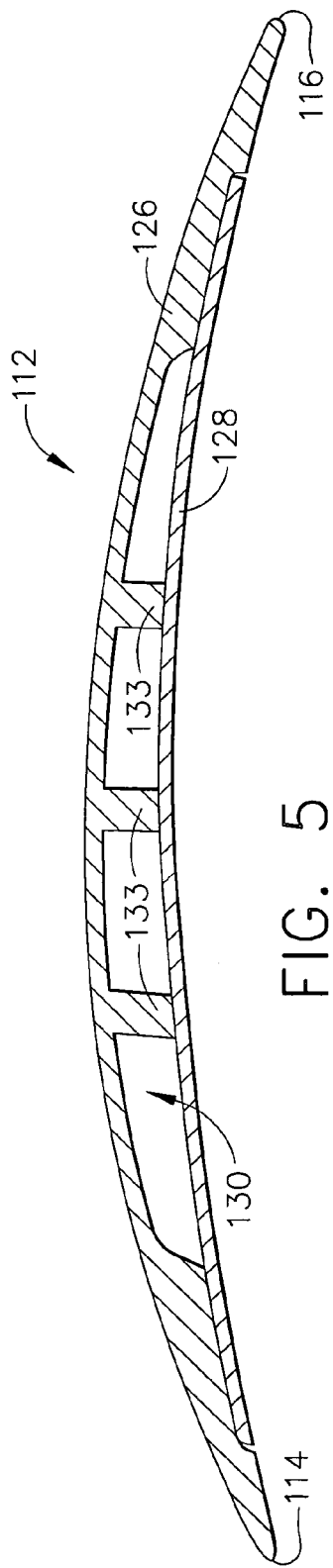
FIG. 5 is a cross-sectional view taken along lines 5—5 of FIG. 4.

FIGS. 4 and 5 illustrate an alternative airfoil 112. The airfoil 112 is substantially similar to the airfoil 12 described above and is constructed from a body 126 and a cover 128. The airfoil 112 includes a leading edge 114, a trailing edge 116, a tip 118, a root 119, a convex suction side 120, and a concave pressure side 122. A recessed pocket 130 is formed in the pressure side 122 to reduce the weight of the airfoil 112, and is sealed off by the cover 128. The pocket 130 could also be formed in the suction side 120. The body 126 includes a plurality of upstanding, spaced-apart ribs 133 disposed in the pocket 130 which extend in the radial direction (i.e. from the root 119 to the tip 118). The ribs 133 serve both to stiffen the airfoil 112 itself, and to restrain the relatively flexible cover 28 against undesirable fatigue and stresses caused by vibrations during engine operation, i.e. 1/rev/blade excitations.

Figure 6:
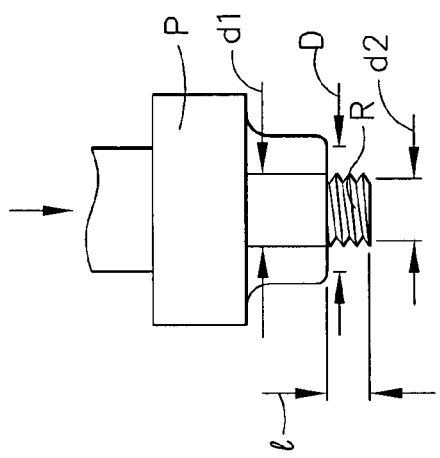
FIG. 6 is an enlarged view of a portion of FIG. 3.
Figure 6:
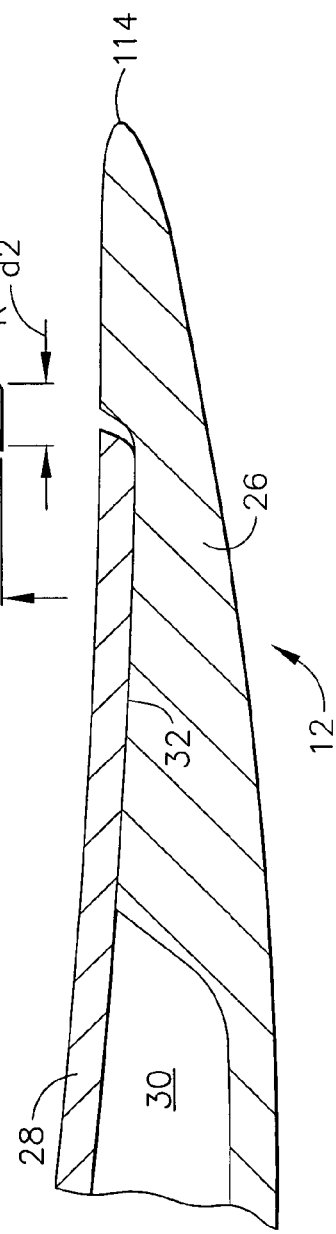

The cover 28 is joined to the body 26 using a friction stir welding process. The welding process is carried out using friction stir welding machinery and fixtures of a known type (not shown). As shown in FIG. 6, a cylindrical, shouldered, wear-resistant pin "P" having a tip "R" is rotated and forced against the joint line between the cover 28 and the body 26. The friction between the pin P and the airfoil 12 causes the material to soften and flow without melting. Thus, friction stir welding is a type of solid state bond. In the illustrated example the pin P has a shoulder diameter "D" of about 10.7 mm (0.420 in.), and the tip R has a length "l" of about 2.8 mm (0.110 in.) from the shoulder to its distal end and tapers from a diameter "d1" of about 10.7 mm (0.420 in.) in diameter near the shoulder to a diameter "d2" of about 3.2 mm (0.125 in.) diameter at its distal end, and has a left-hand thread formed thereon. The following exemplary parameters have been found to produce an acceptable friction stir welded bond: Pin speed about 700 to about 900 RPM, and preferably about 800 RPM; traversing speed about 10 cm/min. (4 in/min.) to about 15.2 cm/min. (6 in/min.), and preferably about 5 in/min.; and force on the pin P about 499 kg (1100 lbs.) to about 635 kg (1400 lbs.), and preferably about 590 kg (1300 lbs.) The pin P is traversed along the periphery of the cover 28, straddling the cover and the surface of the body 26, leaving the cover 28 and body 26 bonded together behind it. If an airfoil 112 having ribs 133 is used, the cover 128 is also friction stir welded to the ribs 133 as well, by traversing the pin "P" over the cover 128 along the rib locations. This process causes very little distortion compared to other forms of welding. The completed weld leaves a smooth surface finish in the joint area which requires minimal processing to result in an acceptable finished product. Typically, there may be a recessed zone about 0.05 mm (0.002 in.) deep along the weld path. If necessary, a minor polishing operation may be performed to smooth out this zone. Furthermore, the friction stir weld process can be accomplished with a minimum of distortion which facilitates simplification of post weld heat treatment, if necessary. Compared to adhesive bonding, friction stir welding reduces bond integrity variability, significantly increases bond strength, facilitates further weight reductions through reduction of material overlaps, and provides a metallurgically sound seal to prevent contamination of the pocket 30 from the surrounding environment.

Figure 7:
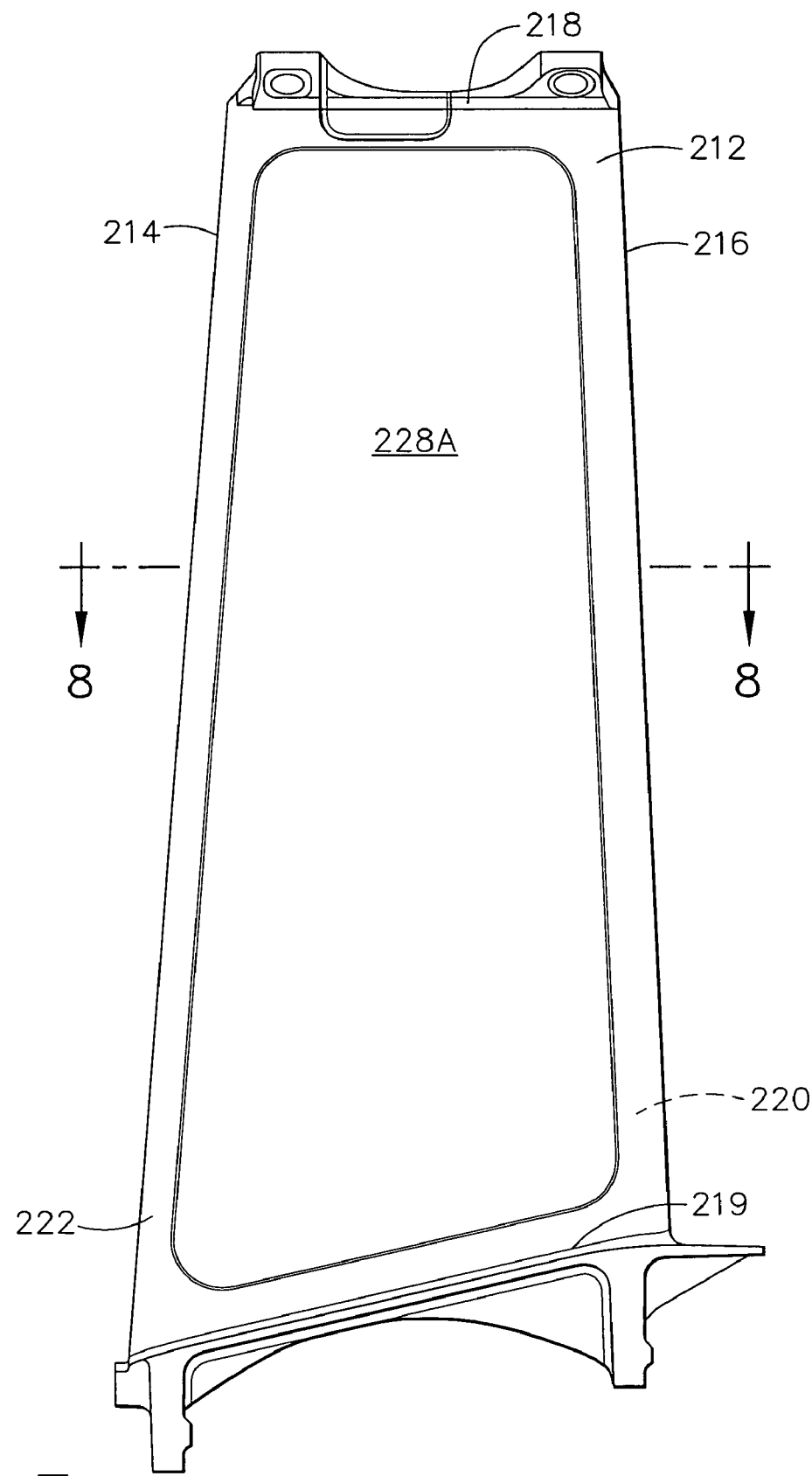
FIG. 7 is a side view of an outlet guide vane constructed according to another alternate embodiment of the invention.
Figure 8:
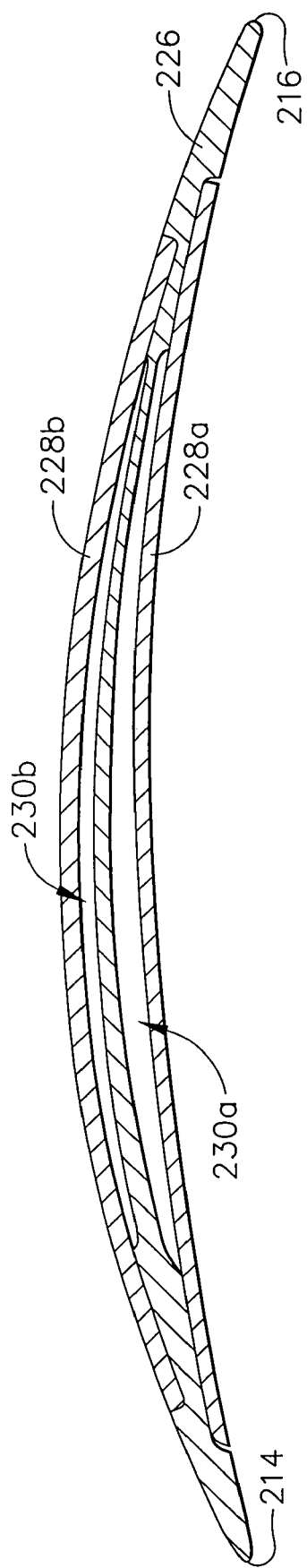
FIG. 8 is a cross-sectional view taken along lines 8—8 of FIG. 7.

FIGS. 7 and 8 illustrate an alternative airfoil 212. The airfoil 212 is substantially similar to the airfoil 12 described above and is constructed from a body 226 and covers 228a, 228b. The airfoil 212 includes a leading edge 214, a trailing edge 216, a tip 218, a root 219, a convex suction side 220, and a concave pressure side 222. Recessed first and second pockets 230a, 230b are formed in the pressure side 222 and suction side 220 respectively to reduce the weight of the airfoil 212, and are sealed off by covers 228a and 228b. The body 226 may include a plurality of upstanding, spaced-apart ribs (not shown) disposed in the pockets 230a and 230b, similar to ribs 33 described above, or a filler material (not shown) as described above.

Figure 9:
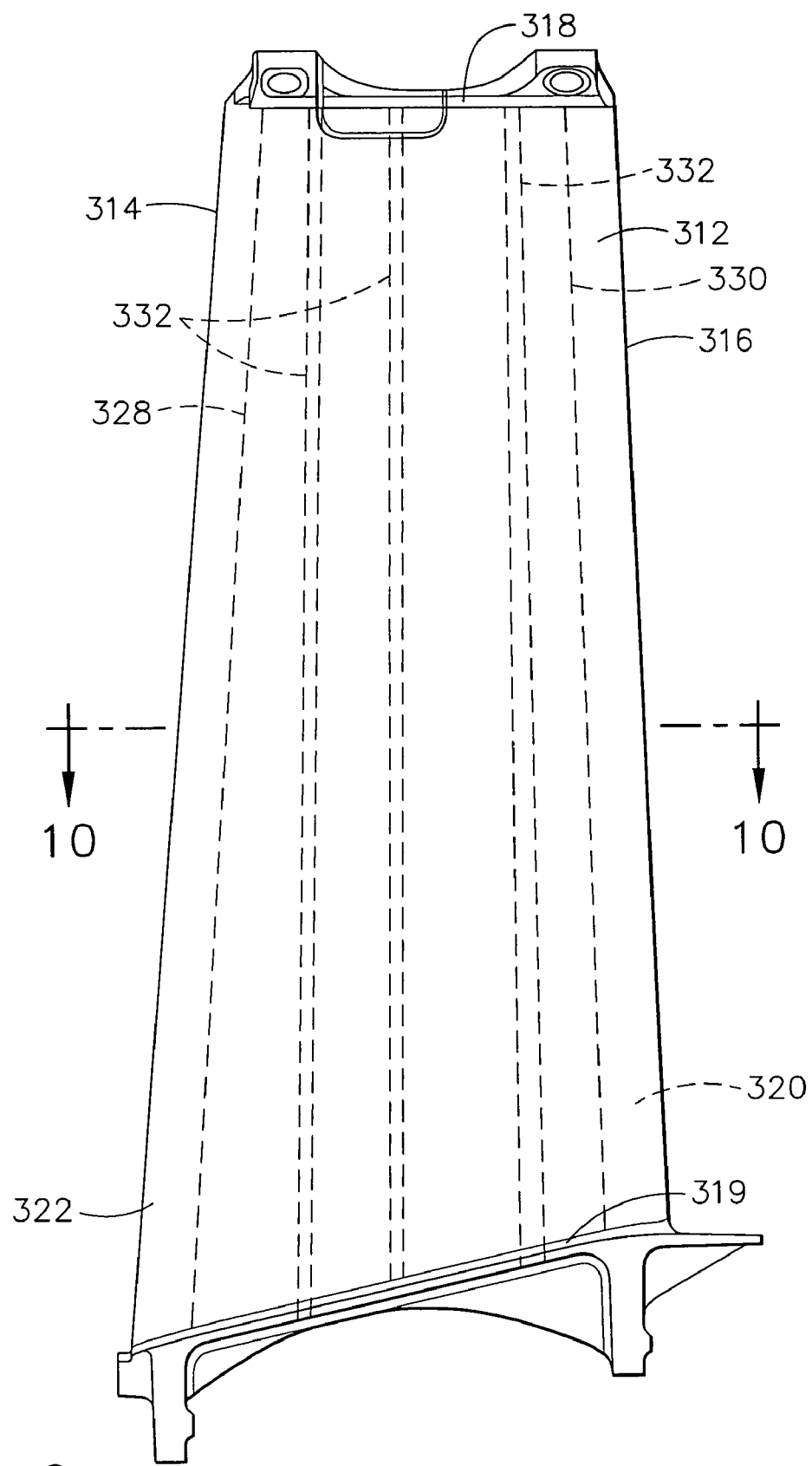
FIG. 9 is a side view of an outlet guide vane constructed according to another alternate embodiment of the invention.
Figure 10:
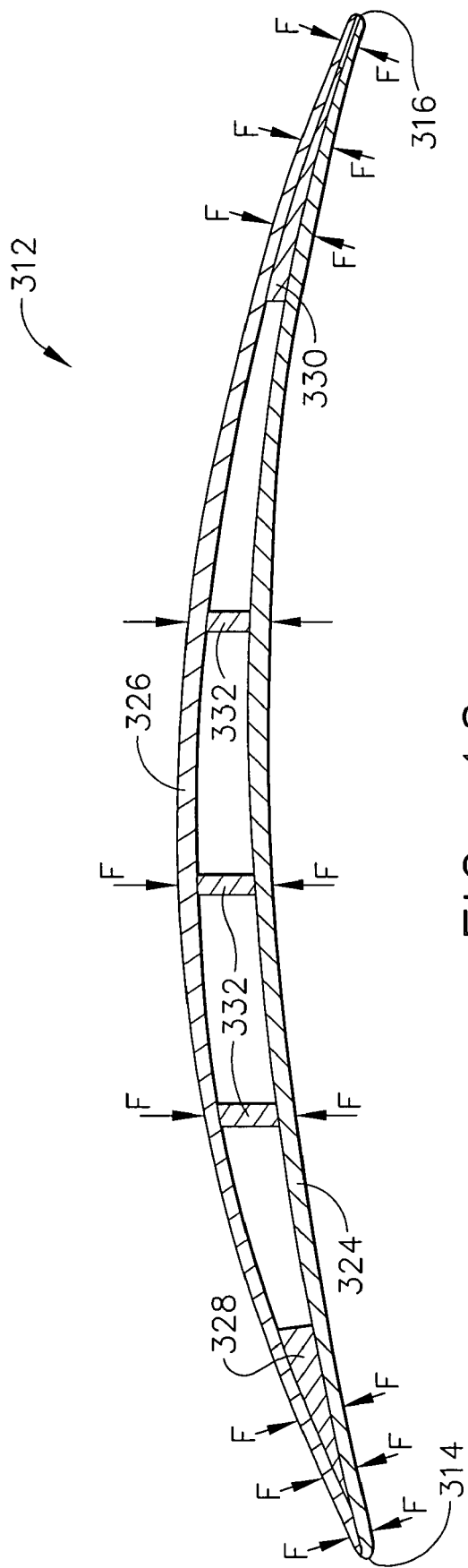
FIG. 10 is a cross-sectional view taken along lines 10—10 of FIG. 9—9.

FIGS. 9 and 10 illustrate another alternative airfoil 312. The airfoil 312 includes a leading edge 314, a trailing edge 316, a tip 318, a root 319, a convex suction side 320, and a concave pressure side 322. The airfoil 312 is built up from individual components including a pressure side wall 324, a suction side wall 326, a leading edge spacer 328, a trailing edge spacer 330, and a plurality of internal spacers 332. The internal spacers 332 in the illustrated example are rectangular, spanwise ribs. However, the internal spacers 332 could comprise an array of pins or other similar elements. Using this built-up construction, the individual components may be relatively simple, inexpensive structural elements. For example the pressure and suction side walls 324 and 326 may be aluminum sheet material, the leading and trailing edge spacers 328 and 330 could be aluminum extrusions, and the internal spacers 332 could be cast, forged, or extruded from aluminum. Other arrangements of built-up components are possible.

To assemble the airfoil 312, the pressure side wall 324, suction side wall 326, leading edge spacer 328, trailing edge spacer 330, and internal spacers 332 are retained in the appropriate positions using suitable tooling of a known type (not shown). The components are then joined by friction stir welding as described above. For example, friction stir welds may be located as indicated by the exemplary arrows "F" in FIG. 10. To ensure the security of the bonds, several overlapping adjacent welds may be made between the pressure and suction side walls 324 and 326 and the leading and trailing edge spacers 328 and 330. In the illustrated example the suction and pressure side walls 324 and 326 extend past the leading and trailing edge spacers 328 and 330 to merge with each other at the leading and trailing edges 314 And 316, respectively. However, if desired the pressure and suction side walls 324 and 326 could stop short of the leading and trailing edges in the chordwise direction, in which case the leading and trailing edge spacers 328 and 330 would define the leading and trailing edges of the airfoil 312. After the welding operation in complete, the airfoil 312 may be machined to form its final contours.

The foregoing has described a hollow airfoil structure having a cover attached by friction stir welding, and a process for making such an airfoil. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A hollow airfoil, comprising:
    a metallic body having opposed pressure and suction sides, a root, a tip, and spaced-apart leading and trailing edges, said body having a recessed first pocket formed in a selected one of said pressure and suction sides;
    a filler material disposed in said first pocket; and
    a first metallic cover having an outer peripheral edge, an inner surface, and an outer surface, said outer surface defining at least a portion of said selected one of said pressure or suction sides, wherein said first cover is attached to said body by a solid state bond.

2. The hollow airfoil of claim 1 wherein said first pocket includes at least one upstanding rib which extends in a direction from said root to said tip, and said first cover is attached to said rib by a solid state bond.

3. The hollow airfoil of claim 1 wherein said body includes a recessed ledge extending around the periphery of said first pocket which is adapted for receiving said first cover such that said outer surface of said first cover fits substantially flush with said selected one of said pressure and suction sides of said airfoil.

4. The hollow airfoil of claim 1 wherein said cover and said body comprise a 7000 series aluminum alloy.

5. The hollow airfoil of claim 4 wherein said cover and said body comprise a 7075 aluminum alloy.

6. The hollow airfoil of claim 1 wherein said airfoil forms part of a fan outlet guide vane.

7. The hollow airfoil of claim 1 wherein said solid state bond is a friction stir weld.

8. The hollow airfoil of claim 1 wherein said filler material is a honeycomb structure.

9. The hollow airfoil of claim 1 wherein said filler material is bonded to at least one of said first pocket and said first cover with an adhesive.

10. The hollow airfoil of claim 1 further comprising:
    a second recessed pocket formed in the other one of said pressure and suction sides; and
    a second metallic cover having an outer peripheral edge, as inner surface, and an outer surface, said outer surface defining at least a portion of said other one of said pressure or suction sides, wherein said second cover is attached to said body by a solid state bond.

11. The hollow airfoil of claim 10 wherein said body includes a recessed ledge extending around the periphery of said second pocket which is adapted for receiving said second cover such that said outer surface of said second cover fits substantially flush with said other one of said pressure and suction sides of said airfoil.

12. The hollow airfoil of claim 10 further comprising a filler material disposed in said second pocket.

13. The hollow airfoil of claim 12 wherein said filler material is a honeycomb structure.

14. The hollow airfoil of claim 12 wherein said filler material is bonded to at least one of said second pocket and said second cover with an adhesive.

15. A method of making a hollow airfoil, comprising:
    providing an airfoil-shaped body having spaced-apart leading and trailing edges, spaced-apart pressure and suction sides, a root, and a tip, a selected one of said pressure and suction sides having a first pocket formed therein;
    providing a first cover with a perimeter matching the perimeter of said first pocket, and an outer surface defining at least a portion of said selected one of said pressure or said suction sides;
    placing a filler material in said first pocket;
    placing said cover in said first pocket; and
    joining said first cover to said body by friction stir welding such that said first pocket is sealed from a surrounding environment.

16. The method of claim 15 wherein the step of placing said first cover in said first pocket further comprises placing said first cover against a recessed ledge formed in said body which extends around the periphery of said first pocket, the depth of said first pocket being selected to position said first cover such that said outer surface of said first cover fits substantially flush with said selected one of said pressure and suction sides of said airfoil.

17. The method of claim 15 wherein said filler material is a honeycomb structure.

18. The method of claim 15 further comprising bonding said filler material to at least one of said first pocket and said first cover with an adhesive.

19. The method of claim 15 further comprising:
    forming a second recessed pocket in the other one of said pressure and suction sides of said body;
    providing a second cover with a perimeter matching the perimeter of said second pocket, and an outer surface defining at least a portion of the other one of said pressure or said suction sides;
    placing said cover in said second pocket; and
    joining said second cover to said body by friction stir welding such that said second pocket is sealed from a surrounding environment.

20. The method of 19 further comprising placing a filler material in said second pocket.

21. The method of claim 20 wherein said filler material is a honeycomb structure.

22. The method of claim 20 further comprising bonding said filler material bonded to at least one of said second pocket and said second cover with an adhesive.

23. The method of claim 15 wherein said first pocket includes at least one upstanding rib which extends in a direction from said root to said tip, and said first cover is attached to said rib by friction stir welding.

24. The method of claim 15 wherein said first cover and said body comprise a 7000 series aluminum alloy.

25. The method of claim 24 wherein said first cover and said body comprise a 7075 aluminum alloy.

26. The method of claim 15 wherein said airfoil forms part of a fan outlet guide vane.

27. A hollow airfoil having opposed pressure and suction sides, a root, a tip, and spaced-apart leading and trailing edges, said airfoil comprising:
- a metallic pressure side wall extending from said leading edge to said trailing edge;
- a metallic suction side wall extending from said leading edge to said trailing edge, said suction side wall disposed in spaced-apart relation to said pressure side wall;
- a metallic leading edge spacer extending from said root to said tip, the leading edge spacer separate from and disposed between said pressure and suction side walls; and
- a metallic trailing edge spacer extending from said root to said tip, the trailing edge spacer separate from and disposed between said pressure and suction side walls;
- wherein said pressure side wall and said suction side wall are attached to said leading and trailing edge spacers by a plurality of solid state bonds.

28. The hollow airfoil of claim 27 further comprising at least one metallic internal spacer disposed between said pressure and suction side walls, said internal spacer being attached to each of said pressure and suction side walls by a solid state bond.

29. The hollow airfoil of claim 28 wherein said internal spacer extends from said root to said tip of said airfoil.

30. The hollow airfoil of claim 27 wherein said pressure side wall, said suction side wall, said reading edge spacer, and said trailing edge spacer comprise a 7000 series aluminum alloy.

31. The hollow airfoil of claim 27 wherein said pressure side wall, said suction side wall, said leading edge spacer, and said trailing edge spacer comprise a 7075 aluminum alloy.

32. The hollow airfoil of claim 27 wherein said airfoil forms part of a fan outlet guide vane.

33. The hollow airfoil of claim 27 wherein said solid state bond is a friction stir weld.

* * * * *

UNITED STATES PATENT AND TRADEMARK OFFICE
CERTIFICATE OF CORRECTION

| | |
|---|---|
| PATENT NO. | : 7,189,064 B2 |
| APPLICATION NO. | : 10/846326 |
| DATED | : March 31, 2007 |
| INVENTOR(S) | : Helder et al. |

It is certified that error appears in the above-identified patent and that said Letters Patent is hereby corrected as shown below:

Claim 30, Column 8, line 8, delete "reading" and enter --leading--.

Signed and Sealed this

Twenty-second Day of May, 2007

JON W. DUDAS
*Director of the United States Patent and Trademark Office*

UNITED STATES PATENT AND TRADEMARK OFFICE
CERTIFICATE OF CORRECTION

PATENT NO.         : 7,189,064 B2                                         Page 1 of 1
APPLICATION NO. : 10/846326
DATED              : March 13, 2007
INVENTOR(S)        : Helder et al.

It is certified that error appears in the above-identified patent and that said Letters Patent is hereby corrected as shown below:

Claim 30, Column 8, line 8, delete "reading" and enter --leading--.

This certificate supersedes Certificate of Correction issued May 22, 2007.

Signed and Sealed this

Twelfth Day of June, 2007

JON W. DUDAS
*Director of the United States Patent and Trademark Office*